Jan. 12, 1971     E. V. CONKLE     3,554,666

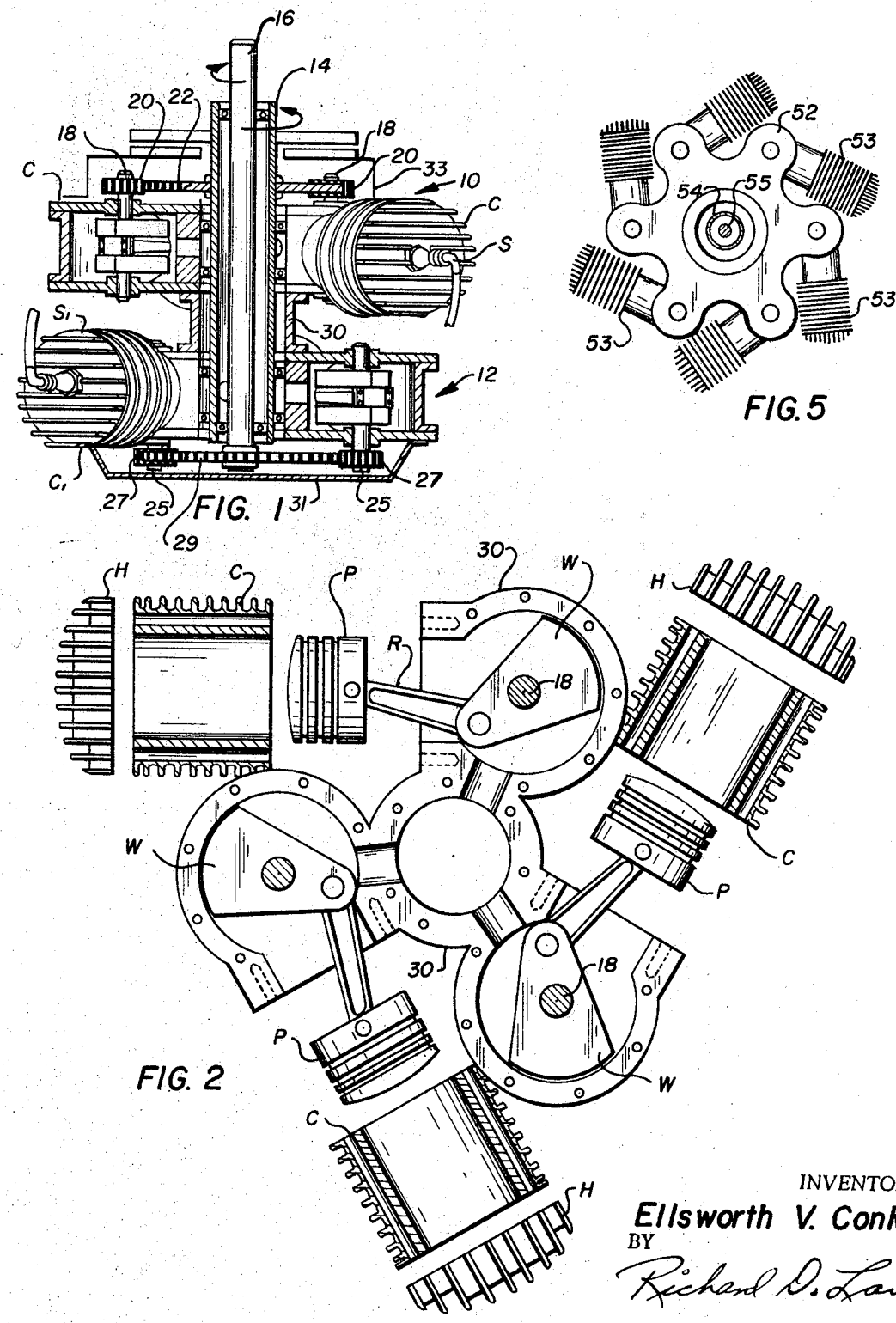

ENGINE SYSTEM FOR HELICOPTER

Filed Oct. 28, 1968     3 Sheets-Sheet 2

INVENTOR.
Ellsworth V. Conkle
BY
*Richard D. Law*
ATTORNEY

Jan. 12, 1971    E. V. CONKLE    3,554,666
ENGINE SYSTEM FOR HELICOPTER
Filed Oct. 28, 1968    3 Sheets-Sheet 3

INVENTOR.
*Ellsworth V. Conkle*
BY
*Richard D. Law*
ATTORNEY

United States Patent Office 3,554,666
Patented Jan. 12, 1971

3,554,666
ENGINE SYSTEM FOR HELICOPTER
Ellsworth V. Conkle, P.O. Box 190,
Paonia, Colo. 81428
Filed Oct. 28, 1968, Ser. No. 771,012
Int. Cl. B64c 27/10
U.S. Cl. 416—125                                      11 Claims

ABSTRACT OF THE DISCLOSURE

An engine system, including its mounts, for a helicopter includes at least a pair of banks of radial cylinders, each bank rotating one of a pair of concentric shafts in counter-rotation to the other, and with rotor blades secured on each shaft, is arranged for tilting the motor in its mounts thereby tilting the rotor blades to direct such blades in a desired tilted position for propelling the helicopter in a desired direction. The banks of radial pistons are essentially balanced and counter-rotating whereby the engine does not have the usual engine torque, and a pivoted rudder in the airstream from the rotors is all that is necessary for yaw control and rotational control of the craft.

Modern helicopters are made of two general types; the first and probably most common being a craft propelled by a pair of concentrically mounted rotors which rotate in opposite directions, utilizing a single engine for rotating both rotors; and the other type generally being considerably larger than the first type, using two spaced-apart rotors which rotate independently of each other and each rotor being driven by a separate engine. In the latter helicopter the diameter of the two rotors requires a very long fuselage, and normally one engine is placed in the front for operating the front rotor and one engine is placed in the rear for operating the rear rotor. A rudder at the rear of the craft gives directional control. On the former aircraft, however, an auxiliary, rearwardly disposed propeller, rotating parallel to the longitudinal axis of the craft, must be used to prevent auto rotation of the craft due to the torque of the engine. Also, directional movement is achieved by tilting the rotors in the direction desired usually, forwardly and rearwardly. The physical construction of the rotors induces considerable structural problems for providing a 360° articulated joint, which is necessary to permit 360° tilting of the rotors, and one solution was the use of a swash plate. While the swash plate does permit 360° tilting of the rotors its design is quite complicated and its reliability has been quite poor. Maintenance of such helicopters is expensive and must be accomplished very frequently.

Due to space limitations, that is, the large diameter of the rotors necessary for inducing and substaining flight of a helicopter, it has not been possible to produce a single engine helicopter with two spaced-apart rotors. The use of twin engines for operating the twin spaced-apart rotors greatly increases the cost, the complexity of the design, and the control of the aircraft. Generally, there can only be a minimum of overlap between the spaced-apart rotor blades, as the air turbulences created by the upper blade adversely effects the lift characteristics lower blades. The single motor helicopter, with counter-rotating blades, on the other hand, can be made considerably less expensively than a twin rotor craft and obviously may be made considerably smaller. Further, even with the complicated swash plate, the single engine helicopter is the most used extensively by the military and general aviation.

According to the present invention, I have provided an engine which does away with the need of a swash plate and the auxiliary rotor since the engine is provided with counter-rotating banks of pistons providing a power plant essentially without torque, and which is arranged with counter-rotating shafts for mounting counter-rotating helicopter rotor blades thereon. The mounting of the engine on the helicopter frame is quite simple being either as a pivoted engine for tilting forward and rearwardly or being mounted in a gimble mount for a full 360° tilt capability. When mounted in a helicopter the auxiliary rotor found in most single engine helicopters is not necessary and a single, universally mounted rudder at the rear of the craft provides rotational control as well as directional control for the craft.

Included among the objects and advantages of the present invention is a helicopter arranged with a single engine having at least a pair of counter rotating banks of pistons, and concentric counter rotating shafts for attachment of counter-rotating rotor blades which greatly reduces the complexity and the cost of a single engine helicopter.

Another object of the invention is to provide an engine system having at least one pair of sets of counter rotating pistons operating a pair of counter rotating concentric shafts which may be rotated independently or conjointly with one another.

Another object of the invention is to provide an engine system for operating counter rotating rotors of a helicopter with essentially no engine induced torque on the helicopter, whereby a universal mounted rudder may be used for directional and rotational control of the helicopter.

Yet another object of the invention is to provide an improved engine design for operating concentric counter rotating shafts wherein at least a pair of banks of pistons are operated in counter rotation to each other, utilizing a single feed system for such pistons, providing a simplified carburation system for such engines.

A further object of the invention is to provide an engine whereby any ratio of reduction of speed of driven shaft to engine speed may be built into the gearing of the engine itself.

Another object of the invention is to provide an engine with two pair of sets of pistons having counter rotating shafts for helicopters having means for pitch control of rotor blades through such counter rotating shafts.

These and other objects and advantages of the invention may be readily ascertained by referring to the following description and appended illustrations in which:

FIG. 1 is a side elevational view of one form of engine according to the invention, in partial cut-away section;

FIG. 2 is an exploded schematic detail of a bank of cylinders of the engine of the invention;

FIG. 5 is a top plan generally schematic of a modified form of the invention;

Figure 4:
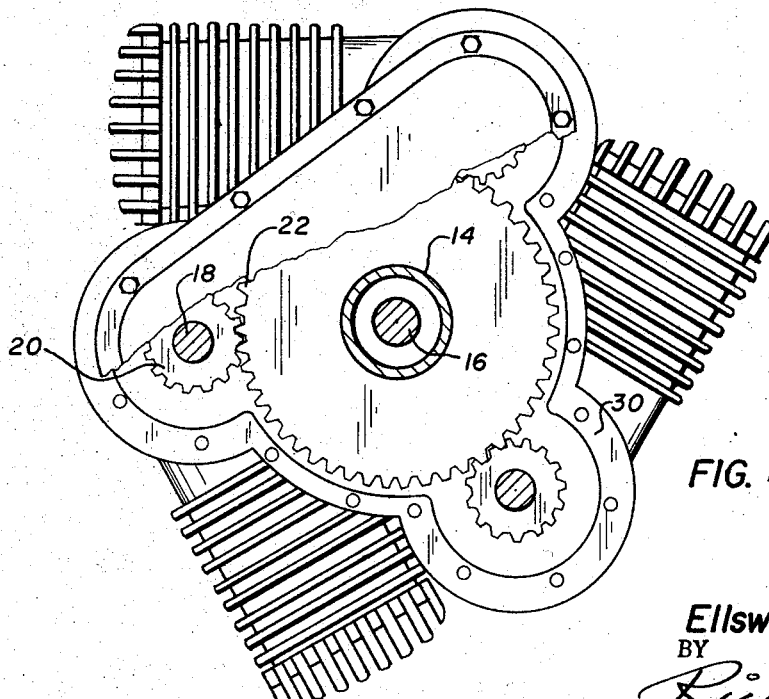
FIG. 4 is a schematic view of a gearing arrangement of the engine of the invention.
Figure 6:
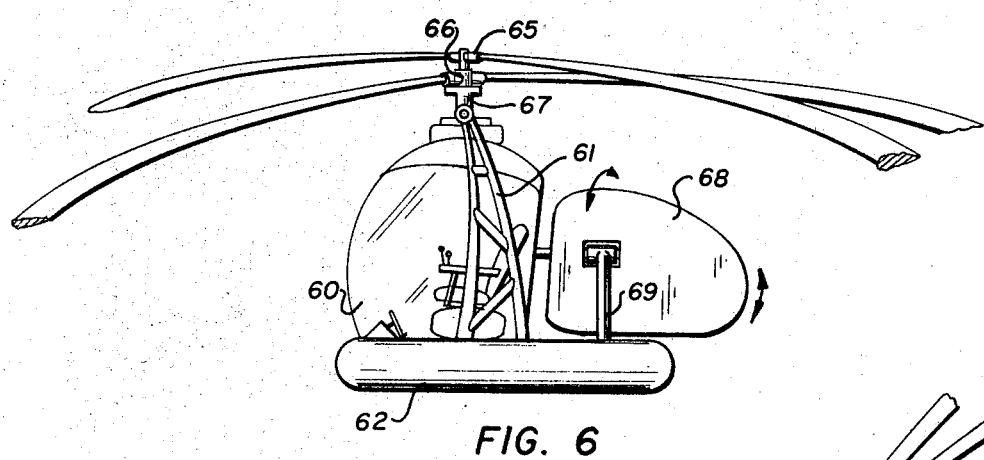
FIG. 6 is a generally schematic, side elevational view of one form of helicopter utilizing an engine according to the invention.
Figure 7:
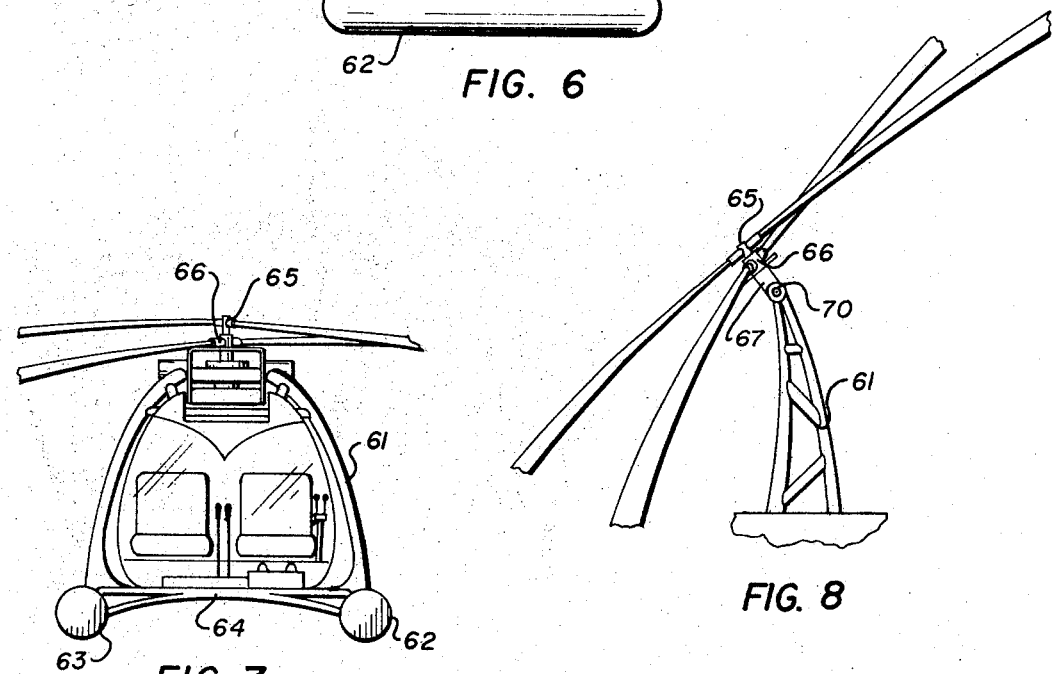
FIG. 7 is a front elevational view of the helicopter of FIG. 6 showing the general mounting arrangement of the engine of the invention.

The engine selected for illustration in FIG. 1-2, illustrates an engine with two banks of cylinders 10 and 12 arranged to drive counter rotating shafts 14 and 15 respectfully. The first bank of pistons C, mounted at an angle to a radial includes spark plugs S, cylinder head H, piston P, and a weighted fly wheel W connected to a piston rod R. The weighted fly wheel is mounted on pin 18 which rotates a planet gear 20 connected thereon shown in FIG. 4, which is connected to and rotates a sun gear 22 attached to the central shaft 14. In a like manner, pistons C, of the second cylinder set through connecting rods rotate shaft 25 on which are mounted planet gears 27 for rotating the sun gear 29 to which is attached the central shaft 16. The housing 30, is arranged to support the finned cylinders C. which are air cooled, with the pistons mounted in the cylinders and the cylinder heads mounted hereon. A cover 31 is mounted over the planet gear set at the bottom of the engine and a cover 33 covers the sun and planet set at the top of the engine. Suitable seals and journalling may be provided for the rotation of the shaft 14 through the cover 33 which is conventional. Fuel and air from a carburetor is injected into the cylinders in the manner of radial engines and exhaust collected in an exhaust manifold. Necessary valving is also in accordance with conventional radial engine practice. Also, the engine may be 2 or 4 cycles in accordance with conventional practice.

Figure 3:
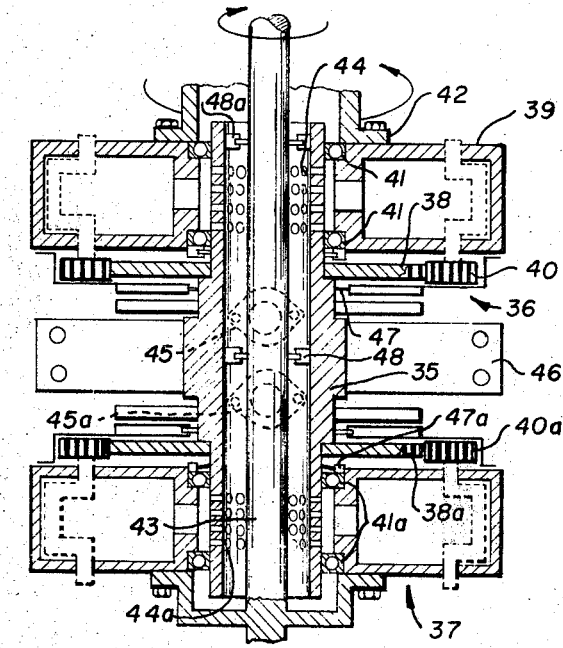
FIG. 3 is a generally schematic view of one form of engine of the invention.

The engine illustrated in FIG. 3 has central stationary tube 35 around which rotates cylinder banks 36 and 37. A stationary sun gear 38 permits housing 39 to rotate around it by pistons rotating planet gears 40 meshed therewith. Bearings 41 permit the cylinder housing 39 to rotate around the tube. A hollow shaft 42 is bolted to the housing for rotation therewith and rotors of a helicopter may be secured thereto. The lower bank of cylinders 37 rotate in the opposite direction, for helicopters, around stationary sun gear 38a driven with the housing rotating on bearings 41a by planet gears 40a. A central shaft 43 is bolted to cylinder housing 37. Apertures 44 in the upper bank and apertures 44a in the lower bank permits air-fuel mixture from carburetors (not shown) mounted on manifolds 45 and 45a to be drawn into the cylinders. Rotary seal 48 separates the annular space inside tube 35 for the upper and lower cylinders and seal 48a closes the annular space forming a manifold for the air-fuel mixture to each bank of cylinders. An engine mount 46 on tube 35 provides support for the engine. Seal 47 for the upper cylinder bank and seal 47a for the lower bank seals on the tube 35.

The separate banks of cylinders for each engine described (i.e. FIG. 1 and FIG. 3) may be operated as separate engines, each with its own carburetor and exhaust systems, as well as its own electrical system. The rotating shafts may be operated independently or connected together, as by gearing, to have conjoint rotation of the shafts. For helicopters, rotor blade pitch controls may be provided by the control leads or cables extending through the shafts of either engine. Since the separate engines are rotating in opposite directions, there are offsetting torques, whether the cylinder banks are turning or stationary. For some applications, the engines may be operated at their optimum speed, with the gearing reducing engine speed to the desired shaft speed, usually lower.

The engine of FIG. 2 illustrates a three piston bank, however, other configurations may be readily adapted for the purpose. For example, FIG. 5 shows a six cylinder bank, which when connected with another six cylinder bank would provide a pair of six cylinder engines with counter rotating shafts. The size of the cylinders, the displacement, as well as the number of cylinders is determined by the horse power requirements for the particular engine. The offset piston arrangement reduces the overall dimensions of the engine providing for easier mounting configurations on various types of aircraft and in particular helicopters. In the illustration of FIG. 5 an engine housing 52 supports cylinders 53 therearound in annular configuration to radials from the central shafts 54 and 55 in a manner similar to that described in FIGS. 1 and 2. Notice that in all of the configurations, the engine weight is generally uniformly distributed radially about the central shaft 14. Since the engine may be tilted with the rotors, the uniform weight distribution is important to good steering characteristics.

Figure 8:
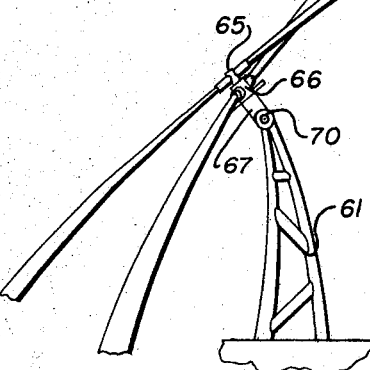
FIG. 8 is a detailed side elevational view showing schematically of the mounting arrangement of the rotors of the helicopter.
Figure 9:
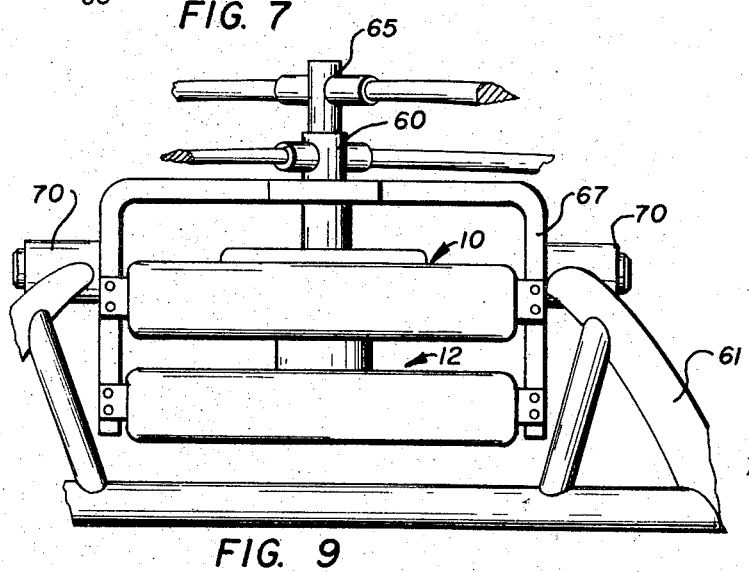
FIG. 9 is a front elevational view in enlarged detail of the mounting arrangement of the engine of the invention.

The engine of the present invention is particularly useful for helicopters, and one configuration of helicopter is shown in FIGS. 6–9, wherein a pilots bubble 60, having engine mount frame work 61 extending up along both sides and over its top, is mounted on the base frame work 64. A pair of pontoons 62 and 63 are secured to the frame-work 64. Upper rotor 65 and lower rotor 66 support rotor blades extending outwardly therefrom. A universally mounted rudder 68, on uprights 69 provides directional control as well as roll control. The rudder 68 pivots vertically about the upright 69 for directional control, and it pivots horizontally for roll control. The schematic of FIG. 8 shows the mounting of the rotor hub 67 pivotally mounted on pivot pins 70 which permits the hub to pivot forwardly and rearwardly of the pivot pin. An engine according to FIG. 1 of the invention is mounted in the yoke like hub 67 with the upper cylinder set 10 and lower cylinder set 12 illustrated in block diagram. Controls in the pilot's compartment provides pivoting movement of the hub 67 around the pivots 70 for propelling the helicopter forwardly or rearwardly. The speed and pitch of the rotors determines the ascent and descent of the craft. The rudder control provides directional and roll control of the craft. Since the engine has counter-rotating piston banks, the torque of the engine is essentially zero and the rudder is all that is necessary to provide directional stability for the helicopter. The engine mount system of FIG. 3 provides pivotal mounting of the engine and with attached rotors a simple control system is provided, as the engine support is easily pivoted.

While the invention has been illustrated by reference to particular embodiments, there is no intent to limit the spirit or scope of the invention to the precise details so set forth except as defined in the following claims.

I claim:

1. A single engine helicopter power plant comprising an internal combustion engine having at least two superposed banks of circumferentially disposed cylinders with pistons and arranged as an internal combustion engine; each piston thereof being connected by its piston rod to a planet gear; each planet gear of each piston being meshed with a sun gear, said sun gear being common to each said bank, a first of said sun gears attached to and arranged to rotate a hollow shaft; the other said sun gear being attached to and arranged to rotate a concentric shaft in said hollow shaft; means for pivotally mounting said engine on a helicopter frame; means for securing superposed two sets of rotor blades on said shafts; means arranged for counter-rotating said shafts and said attached rotor sets; means for pivoting said engine and attached rotor sets at least forwardly and rearwardly of the longitudinal axis of said helicopter; and means for operating said banks as internal combustion engines.

2. A single engine helicopter power plant according to claim 1 wherein said banks of cylinders are stationary and said sun gears rotate.

3. A single engine helicopter power plant according to claim 1 wherein said banks of cylinders rotate on a central stationary tube, and said sun gears are stationary and secured to said tube.

4. A single engine helicopter power plant according to claim 1 wherein said cylinders and pistons of each of said superposed banks are disposed at an angle to radials from the center thereof and arranged at generally equal intervals from each other whereby the engine weight is generally uniformly distributed radially about said hollow shaft.

5. A single engine helicopter power plant according to claim 1 wherein said engine is pivoted at opposed sides in said frame whereby said engine is tlited to tilt rotor blades attached thereto.

6. A single engine helicopter power plant according to claim 1 wherein each piston is connected to weighted fly wheels, and each fly wheel through a shaft rotates said planet gears.

7. A single engine helicopter power plant according to claim 3 wherein said means for pivotally mounting said engine includes a mount secured to said tube between said banks of cylinders and pistons.

8. A single engine helicopter power plant according to claim 1 wherein said banks of cylinders operate independently of each other.

9. A single engine helicopter power plant according to claim 1 wherein said means for pivotally mounting said engine permits 360° pivotal motion thereof.

10. A single engine helicopter power plant according to claim 1 wherein the said superposed piston banks have a generally common engine block.

11. A single engine helicopter power plant according to claim 1 wherein the said means for operating said banks as internal combustion engines comprise an intake manifold means formed between said hollow shaft and said engine block, rotary seals spaced along said hollow shaft sealing one of said cylinder banks from another and the wall of said cylinder block adjacent said intake manifold having a plurality of small apertures formed therein to admit an air-fuel mixture to each of said cylinders.

References Cited

UNITED STATES PATENTS

| | | | |
|---|---|---|---|
| 1,394,870 | 10/1921 | Thomas | 170—135.28 |
| 2,156,334 | 5/1939 | Bothezat | 170—135.26(X) |
| 2,404,014 | 7/1946 | Thornes | 170—135.26(X) |
| 2,838,123 | 6/1958 | Olcott | 170—135.26 |
| 2,938,679 | 5/1960 | Walker | 170—135.26(X) |
| 2,962,100 | 11/1960 | Stahmer | 170—135.28(X) |

FOREIGN PATENTS

| | | | |
|---|---|---|---|
| 521,218 | 5/1940 | Great Britain | 170—135.26 |

EVERETTE A. POWELL, JR., Primary Examiner

U.S. Cl. X.R.

416—129